(12) United States Patent
Hotelling et al.

(10) Patent No.: US 8,035,622 B2
(45) Date of Patent: Oct. 11, 2011

(54) SAR ADC WITH DYNAMIC INPUT SCALING AND OFFSET ADJUSTMENT

(75) Inventors: Steve Porter Hotelling, San Jose, CA (US); Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 804 days.

(21) Appl. No.: 12/057,262

(22) Filed: Mar. 27, 2008

(65) Prior Publication Data

US 2009/0244014 A1    Oct. 1, 2009

(51) Int. Cl.
G06F 3/041    (2006.01)
(52) U.S. Cl. ......... 345/173; 345/174; 345/175; 341/126
(58) Field of Classification Search .......... 345/173–178; 341/126, 155, 158, 164
See application file for complete search history.

(56) References Cited

U.S. PATENT DOCUMENTS

| | | | |
|---|---|---|---|
| 4,641,130 A * | 2/1987 | Mastroianni | 341/136 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,144,331 A * | 11/2000 | Jiang | 341/172 |
| 6,188,391 B1 | 2/2001 | Seely et al. | |
| 6,246,394 B1 * | 6/2001 | Kalthoff et al. | 345/173 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 2002/0015024 A1 * | 2/2002 | Westerman et al. | 345/173 |
| 2003/0063026 A1 * | 4/2003 | Nandy | 341/172 |

(Continued)

FOREIGN PATENT DOCUMENTS

JP    2000-163031 A    6/2000
JP    2002-342033 A    11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Amare Mengistu
*Assistant Examiner* — Koosha Sharifi-Tafreshi
(74) *Attorney, Agent, or Firm* — Morrison & Foerster LLP

(57) ABSTRACT

An apparatus for generating an image of touch on or about a touch-sensitive surface comprising a touch panel is disclosed. The touch panel can include a plurality of touch sensors configured for detecting one or more touch events occurring at distinct locations at about the same time. Each touch event can comprise a touching of an object against the touch-sensitive surface. A plurality of receive channels can be coupled to the touch panel for generating values representative of detected touch events. The receive channels can include a charge redistribution successive approximation register digital-to-analog converter (SAR ADC) configured to convert an analog waveform into a digital representation via a binary search and outputting the digital representation to an output register. The SAR ADC architecture can be such that it the dynamic input range can be scaled and offset adjusted.

13 Claims, 10 Drawing Sheets

U.S. PATENT DOCUMENTS

| | | | |
|---|---|---|---|
| 2005/0162402 A1* | 7/2005 | Watanachote | 345/173 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2006/0232461 A1* | 10/2006 | Felder | 341/161 |
| 2008/0158172 A1 | 7/2008 | Hotelling et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SAR ADC WITH DYNAMIC INPUT SCALING AND OFFSET ADJUSTMENT

FIELD OF THE INVENTION

This relates to panels used as input devices for computing systems, and more particularly, to the detection and processing of touch events (the touching of one or more fingers or other objects upon a touch-sensitive surface).

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Recent touch panels can detect multiple touches and near touches (within the near-field detection capabilities of their touch sensors) occurring at about the same time, and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, and U.S. application Ser. No. 11/649,998 entitled "Proximity and Multi-Touch Sensor Detection and Demodulation," filed on Jan. 3, 2007, the contents of both which are incorporated by reference herein.

Capacitive touch sensor panels can include an array of sensors or pixels formed by drive lines and sense lines in proximity with each other. The drive lines can be driven by stimulation signals, and the change in capacitance at one or more pixels can be detected by receive channels coupled to the sense lines. Each receive channel can include a charge amplifier, anti-aliasing filter, analog-to-digital converter (ADC) and subsequent digital demodulation. Alternately, demodulation can be performed prior to ADC conversion. ADCs can consume large amounts of power dependent on topology, speed and resolution. Accordingly, it can be desirable to reduce the amount of power consumed by the ADCs by implementing a suitable ADC topology and further optimizing of the selected ADC topology.

SUMMARY OF THE INVENTION

Some embodiments of this invention relate to multi-touch controllers that utilize successive approximation register (SAR) ADCs as part of the multi-touch and/or proximity demodulation circuitry for detecting touch or hover events on or about a touch sensor panel. Embodiments of SAR ADCs disclosed herein can consume less power than many other ADCs. Low power consumption can maximize battery life in portable electronics, for example.

In accordance with some embodiments of the invention, the touch panel can include a plurality of touch sensors configured for detecting one or more touch events occurring at distinct locations at about the same time. Each touch event can comprise a touching of an object against the touch-sensitive surface. A plurality of receive channels can be coupled to the touch panel for generating values representative of detected touch events. The receive channels can include a charge redistribution successive approximation register digital-to-analog converter (SAR ADC) configured to convert an analog waveform into a digital representation via a binary search and output the digital representation to an output register. In addition, the SAR ADC architecture can be such that the dynamic input range can be scaled and offset adjusted.

BRIEF DESCRIPTION OF THE DRAWINGS

FIG. 2$b$ is a side view of an exemplary capacitive touch sensor or pixel in a steady-state (no-touch) condition according to various embodiments of this invention.

FIG. 2$c$ is a side view of the exemplary capacitive touch sensor or pixel in a dynamic (touch) condition according to various embodiments of this invention.

FIG. 3$b$ is a more detailed illustration of a virtual ground charge amplifier at the input of an analog channel, and the capacitance contributed by a capacitive touch sensor and seen by the charge amplifier according to various embodiments of this invention.

FIG. 3$c$ illustrates an exemplary Vstim signal with multiple pulse trains each having a fixed number of pulses, each pulse train having a different frequency Fstim according to various embodiments of this invention.

DETAILED DESCRIPTION OF THE PREFERRED EMBODIMENT

Figure 1:
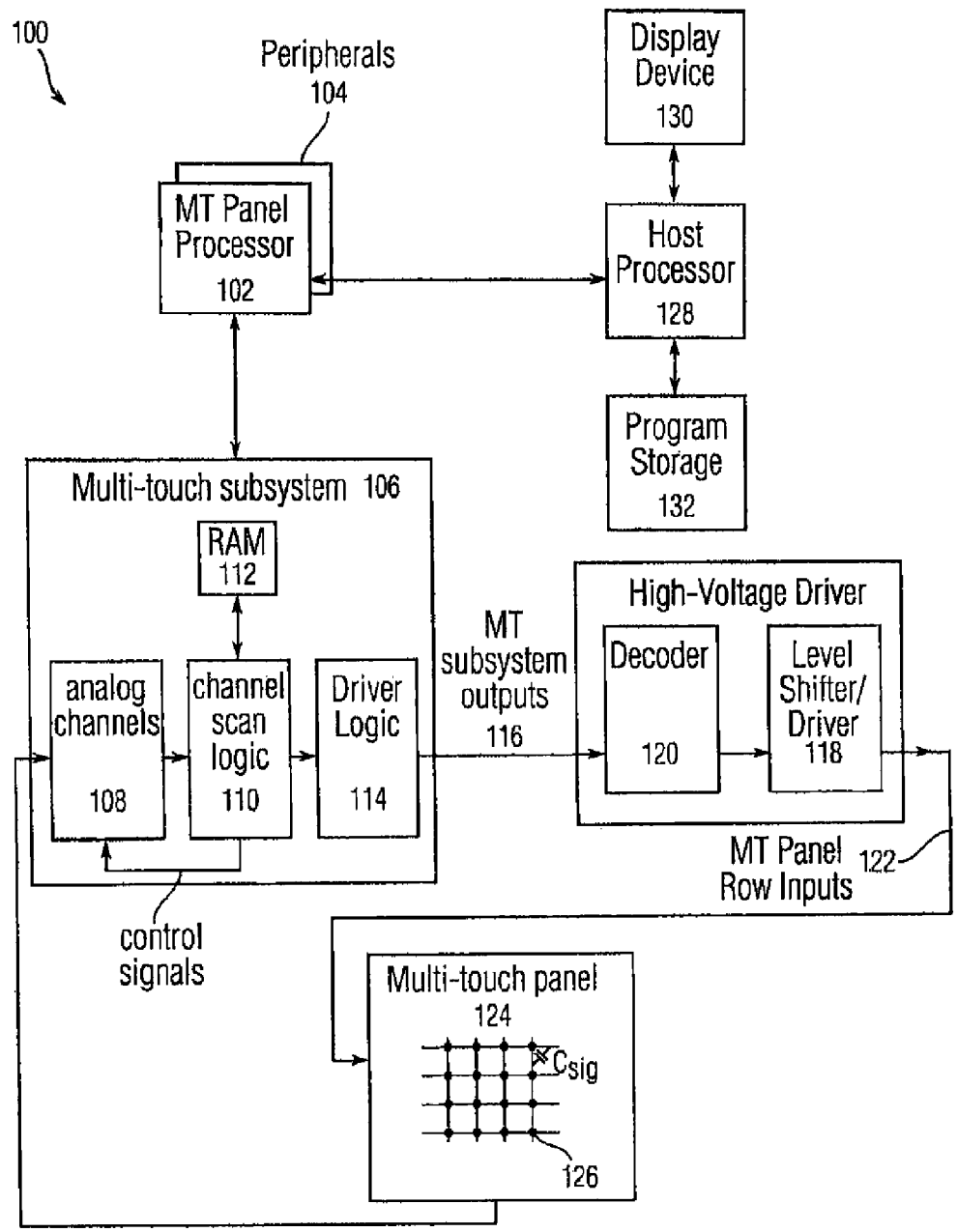
FIG. 1 illustrates an exemplary computing system using a multi-touch panel input device according to various embodiments of this invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Touch or hover events on a touch sensor panel can be detected by charge amplifiers that are capable of detecting changes in the amount of charge coupled onto the sense lines of the touch sensor panel. Embodiments of this invention relate to charge amplifiers and subsequent demodulation circuits (a.k.a. receive channels) that utilize successive approximation register (SAR) ADCs as part of the multi-touch controller subsystem to detect touch or hover events on or about the touch sensor panel. In particular, a charge redistribution successive SAR ADC can be utilized to convert an analog signal into a digital representation via a binary search, and output the digital representation to an output register.

The SAR ADC architecture can enable a dynamic input range of the SAR ADC to be scaled and offset adjusted. In some embodiments, it may not be possible, or it may be difficult, to utilize the full dynamic input range of a SAR ADC because, for example, the circuit driving the ADC may not be able to swing within the limits of the ADC's dynamic input range. Accordingly, various embodiments also provide adjustment of the dynamic input range of a SAR ADC and for offsetting the dynamic input range to maximize the dynamic range of the ADC for any given input signal. Adjusting the dynamic input range to an optimum range can conserve power and result in greater efficiencies, for example.

Although some embodiments of this invention may be described herein in terms of proximity sensors in combination with capacitive touch sensors in a multi-touch panel, it should be understood that embodiments of this invention are not so limited, but are generally applicable to the use of proximity sensors with any type of multi-touch sensor technology that can include resistive touch sensors, surface acoustic wave touch sensors, electromagnetic touch sensors, near field imaging touch sensors, and the like. Also, embodiments of this invention can be utilized in all sorts of applications that digitize an analog signal, including but not limited to multi-touch applications. Furthermore, although the touch sensors in a multi-touch panel can be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, it is noted that some touch sensors, particularly capacitive sensors, can detect some hovering or proximity in the near field. Thus, the term "proximity sensor," as used herein, should be understood to be a proximity sensor that is able to detect hovering objects outside the near-field detection capabilities of touch sensors.

Multi-touch touch-sensitive panels according to one embodiment of this invention can detect multiple touches (touch events or contact points) that occur at about the same time (and at different times), and identify and track their locations. FIG. 1 illustrates exemplary computing system 100 that uses multi-touch panel 124. Computing system 100 can include one or more multi-touch panel processors 102 and peripherals 104, and multi-touch subsystem 106. One or more processors 102 can include, for example, ARM968 processors or other processors with similar functionality and capabilities. However, in other embodiments, the multi-touch panel processor functionality can be implemented instead by dedicated logic, such as a state machine. Peripherals 104 may include, but are not limited to, random access memory (RAM) or other types of memory or storage, watchdog timers and the like. Multi-touch subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 to analog channels 108. In addition, channel scan logic 110 can control the driver logic and stimulation signals being selectively applied to rows of multi-touch panel 124. In some embodiments, multi-touch subsystem 106, multi-touch panel processor 102, peripherals 104 and high-voltage driver can be integrated into a single application specific integrated circuit (ASIC).

Driver logic 114 can provide multiple multi-touch subsystem outputs 116 that drives a high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below (cross) each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as receive channels) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
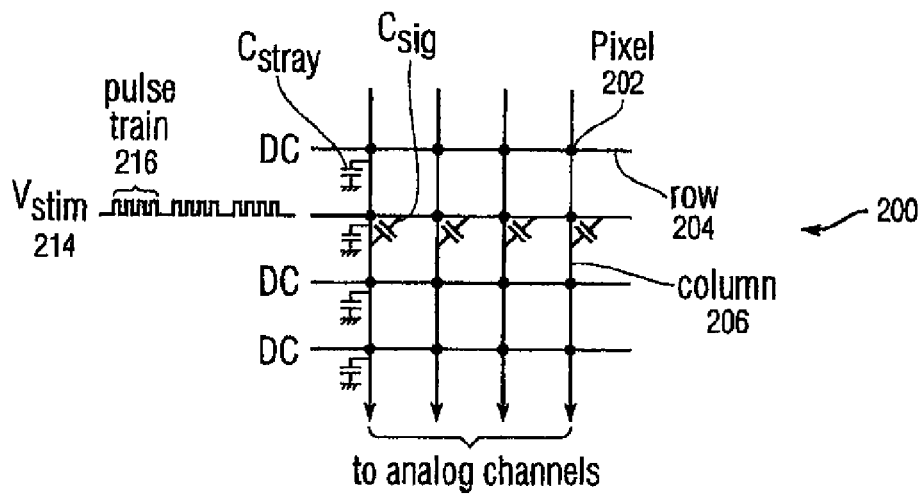
FIG. 2$a$ illustrates an exemplary capacitive multi-touch panel according to various embodiments of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, alternating current (AC) stimulus Vstim 214 is being applied to one row, with all other rows connected to DC. The stimulus causes a charge to be injected into the column electrodes through mutual capacitance at the intersecting points. This charge is Qsig=Csig*Vstm. Each of columns 206 may be selectively connectable to one or more analog channels (see analog channels 108 in FIG. 1).

Figure 2B:
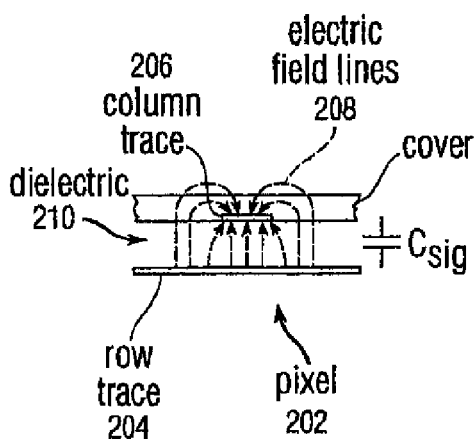

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
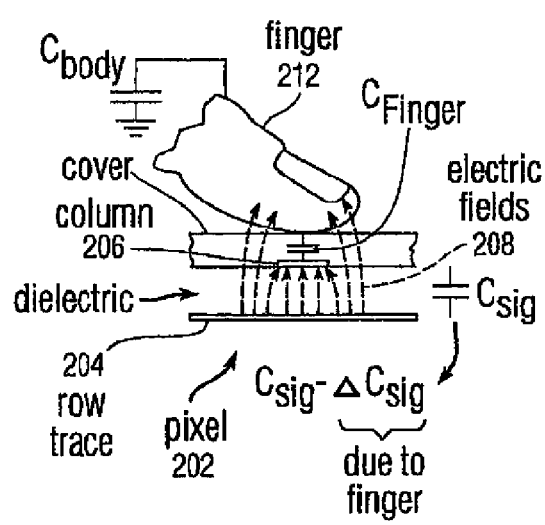

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig–ΔCsig, where Csig represents the static (no touch) component and ΔCsig represents the dynamic (touch) component. Note that Csig–ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage. In yet other embodiments, two or more sections in a panel may be driven at the same time (or nearly the same time) at different phases and frequencies.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
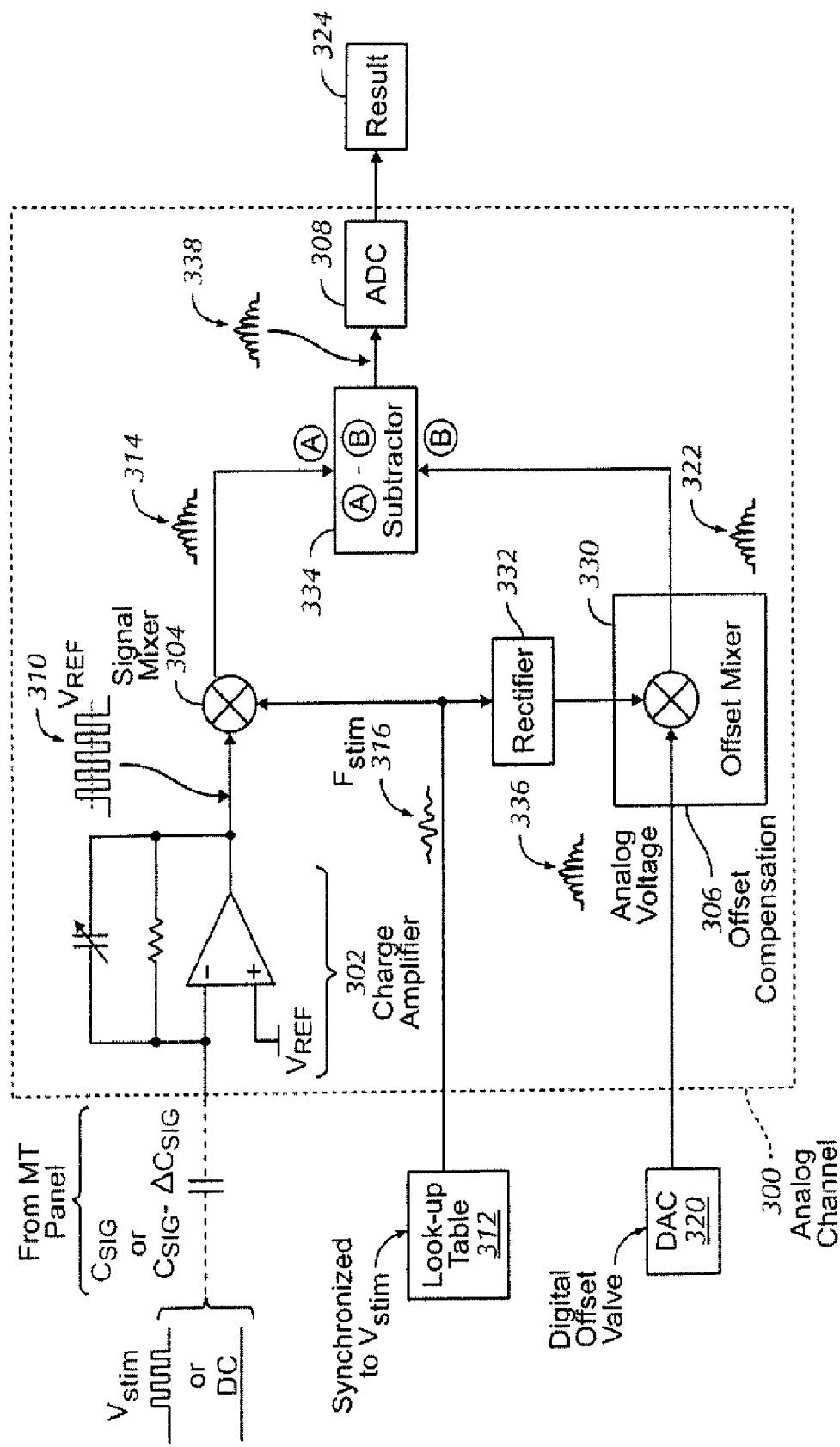
FIG. 3$a$ illustrates an exemplary analog channel (also known as a receive channel) according to various embodiments of this invention.

FIG. 3a illustrates exemplary analog channel or receive channel 300. One or more analog channels 300 can be present in the multi-touch subsystem. One or more columns from a multi-touch panel can be connectable to each analog channel 300. Each front-end channel 300 can include virtual-ground charge amplifier 302 and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Because Vstim can create undesirable harmonics, especially if formed from square waves, demodulation waveform Fstim 316 can be a Gaussian sine wave in an otherwise DC signal that is digitally generated from look-up table (LUT) 312 or other digital logic and synchronized to Vstim. In some embodiments, Fstim 316 can be tunable in frequency and amplitude by selecting different digital waveforms in LUT 312 or generating the waveforms differently using other digital logic. Signal mixer 304 can demodulate the output of charge amplifier 310 by subtracting Fstim 316 from the output to provide better noise rejection. Signal mixer 304 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 300. Signal mixer 304 is essentially a synchronous rectifier as the frequency of the signal at its inputs is the same, and as a result, signal mixer output 314 is essentially a rectified Gaussian sine wave.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the AC capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

Figures 3B, 3C:
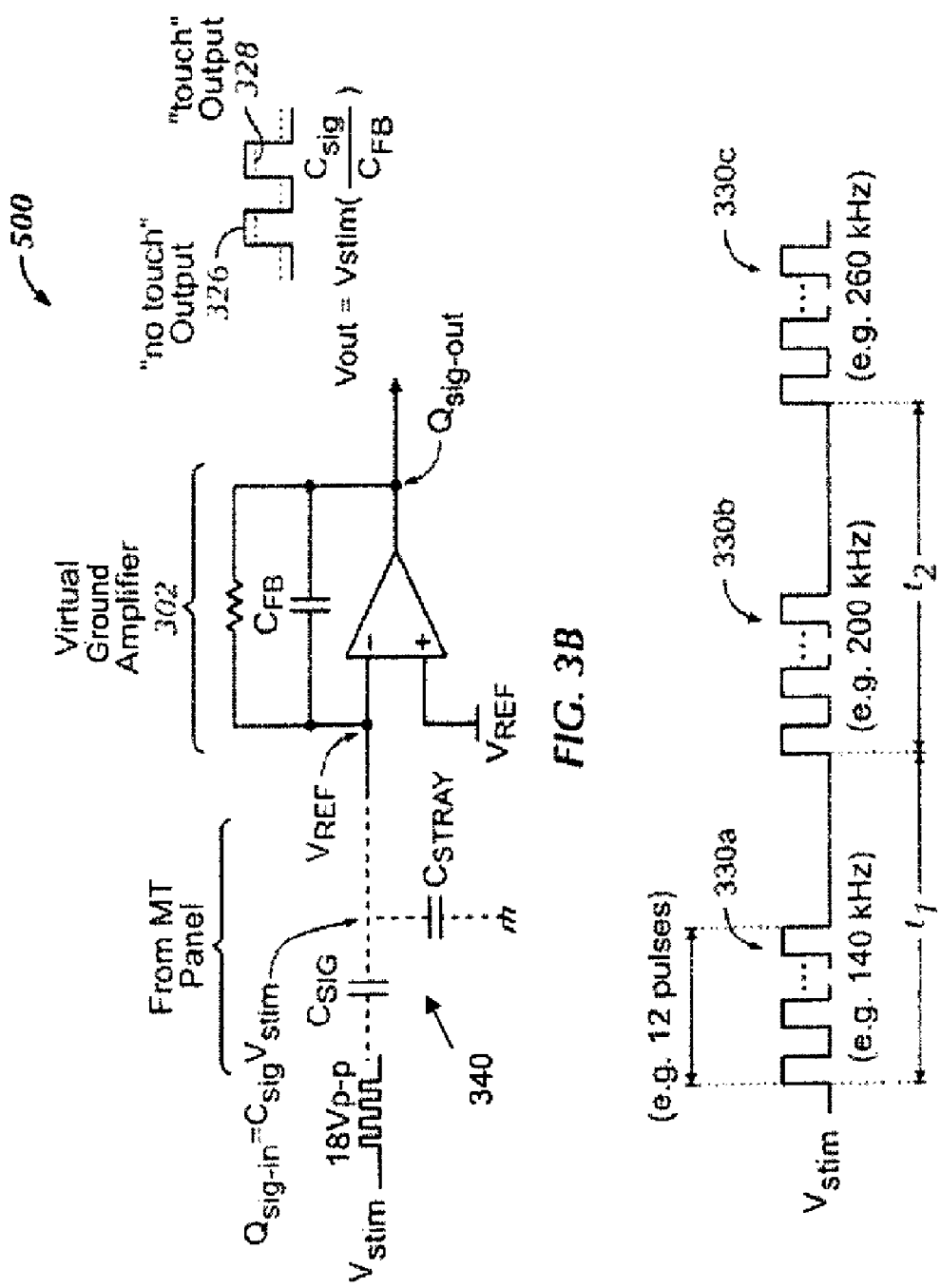

FIG. 3b is a more detailed view of charge amplifier (a virtual ground amplifier) 302 at the input of an analog channel, and the capacitance that can be contributed by the multi-touch panel (referenced generally by numeral 340) and seen by the charge amplifier. As mentioned above, there can be an inherent stray capacitance Cstray at each pixel on the multi-touch panel. In virtual ground amplifier 302, with the noninverting (+) input tied to Vref, the inverting input (−) is also driven to Vref, and a DC operating point is established. Therefore, regardless of how much Csig is present, the −input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the inverting input, the net charge into Cstray will always be zero. Therefore the input charge Qsig_sense=(Csig−ΔCsig_sense)*Vstim is zero when the corresponding row is kept at DC and is purely a function of Csig and Vstim when the corresponding row is stimulated. In either case, because there is no charge across Csig, the stray capacitance is rejected, and need not be taken into account. Thus, even with a disturbance in capacitance field over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) to feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

FIG. 3c illustrates an exemplary Vstim signal with multiple pulse trains each having a fixed number of pulses, each pulse train having a different stimulation frequency, e.g., 140 kHz, 200 kHz, and 260 kHz. With multiple pulse trains at different frequencies, one or more results can be obtained at each frequency. If a static interferer is present at a particular frequency, the results at that frequency can be corrupted as compared to the results obtained at the other two frequencies, and those results can be eliminated. The results at the remaining two frequencies can be averaged to compute the result.

The multiple stimulation frequencies may be applied in different ways to the multi-touch panel. In some embodiments, N columns can be connected to one analog channel via an N:1 demultiplexer. A given row would then have to be stimulated N times to acquire Csig for all columns and then repeated for the other two frequencies. In this embodiment, fewer channels are needed but it takes longer to process an image. In other embodiments, one channel can be allotted for each column. A given row need only be stimulated once to acquire Csig for all columns and then repeated for the other two frequencies. This embodiment can be faster then the previous arrangement described earlier; however, it can take more dedicated channels when implemented in large multi-touch panels. After an entire "image" is captured, it can be processed. In further embodiments, multiple stimuli (scan circuits) can be applied to different rows at the same time to speed up the process.

The stimulation frequencies can be programmable. In some embodiments, a lookup table can be used to synthesize a demodulation waveform. The feedback capacitance Cfb and offset can also be programmable.

Figures 4, 5:
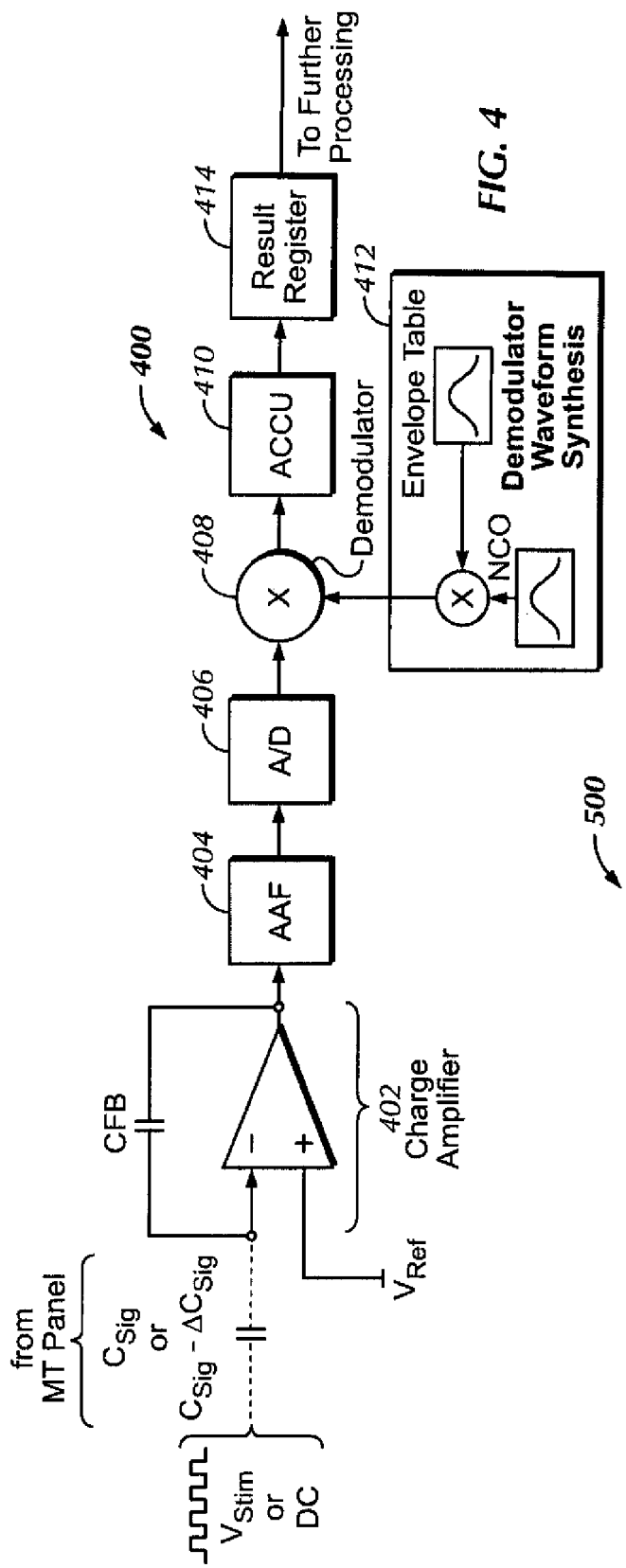
FIG. 4 illustrates a further exemplary analog channel according to various embodiments of this invention.
FIG. 5 is a block diagram of an exemplary successive approximation register analog-to-digital converter (SAR ADC) according to various embodiments of this invention.

FIG. 4 illustrates a further variation of an exemplary receive channel 400 in accordance with some embodiments of the present invention. As described with reference to FIG. 1, one or more analog channels 400 can be present in a multi-touch subsystem, such as multi-touch subsystem 106. Referring again to FIG. 4, one or more columns 206 (FIG. 2a) of a multi-touch panel can be coupable to each analog channel 400. Each analog channel 400 can include charge amplifier 402, anti-aliasing filter 404 and analog-to-digital converter (ADC) 406, digital demodulator 408 and accumulator 410. Digital demodulator 408 can be driven by a NCO (Numerically Controlled Oscillator) 412 that may include envelope shaping. Analog channel 400 can be driven by an input signal (e.g., Vstim or a DC signal) and the steady state signal capacitance Csig when no finger, palm or object is present and the dynamic signal capacitance Csig−ΔCsig that can appear when a finger, palm or other object is present. As illustrated in FIG. 4, receive channel 400 can receive a signal representative of the capacitance or change in capacitance (Csig or Csig−ΔCsig) from a multi-touch panel and convert it into the digital domain as result. The result from accumulator 410 can be stored in result register 414 for further processing. In accordance with some embodiments, receive channel 400 can be implemented as part of an ASIC.

In accordance with some embodiments, ADC 406 can be a successive approximation register (SAR) ADC. In general, a SAR ADC can convert an analog signal into digital representation via a binary search through various quantization levels prior to converging upon a digital output for each conversion. FIG. 5 is a block diagram of an exemplary SAR ADC 500. SAR ADC 500 can include various subcircuits, including analog comparator circuit 502, internal digital-to-analog converter (DAC) 504, control logic block 506, and result register 508. Analog comparator 502 can compare an input voltage (Vin) to the output voltage (Vcomp) of DAC 504 and can output the result of the comparison to control logic block 506. Control logic block 506 can include a successive approximation register designed to supply an approximate digital code of the input voltage Vin to internal DAC 504. A resulting code of a digital approximation of the sampled input voltage Vin can be outputted at the end of a conversion to output register 508.

In an exemplary operation, SAR ADC 500 can be initialized so that a most significant bit (MSB) is equal to a digital 1. This code can be fed to DAC 504 which can then supply the analog equivalent of this digital code, Vdac, into comparator circuit 502 for comparison with the sampled input voltage Vin. If this analog voltage Vdac exceeds the input voltage Vin, control logic block 506 can reset this bit and set the next bit to a digital 1. On the other hand, if this analog voltage Vdac is lower than the input voltage Vin, then control logic block 506 can leave this bit a 1 and can set the next bit to a 1. This binary search can continue until every bit in the SAR ADC 500 has been tested. The resulting code can be the digital approximation of the sampled input voltage Vin and can be output by ADC 500 at the end of a conversion.

Figure 6:
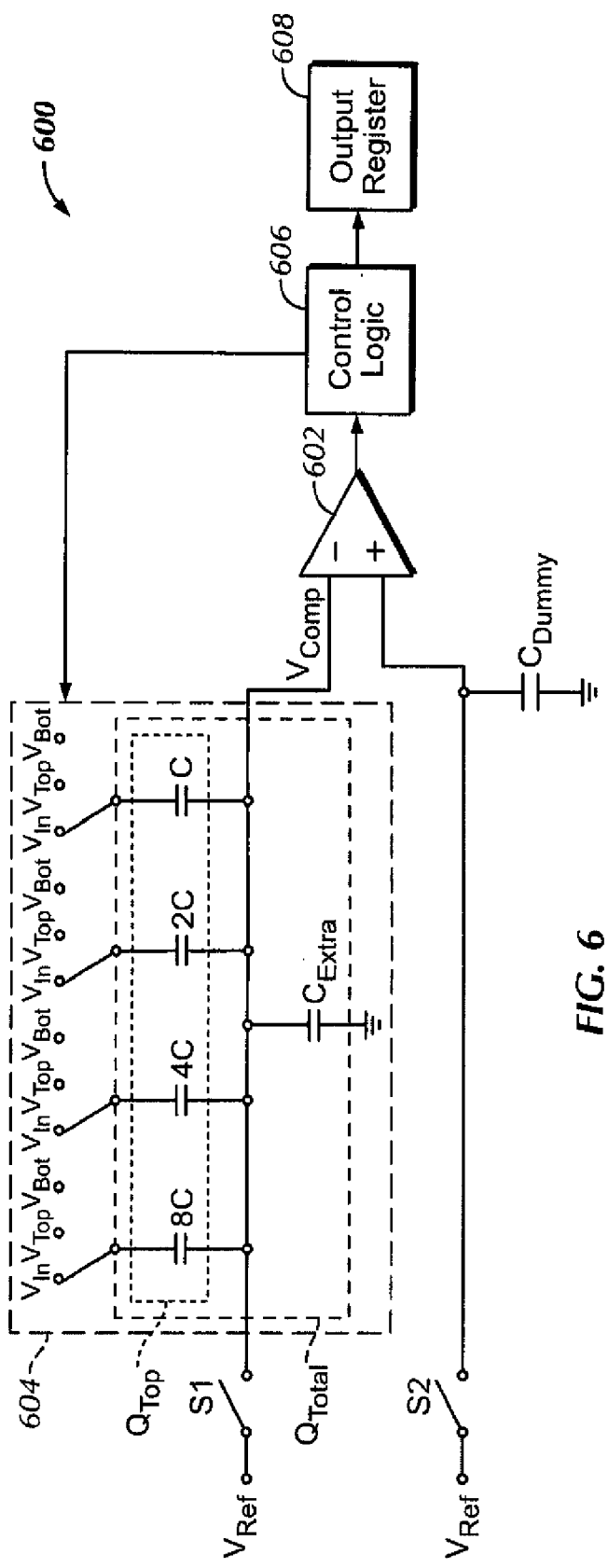
FIG. 6 illustrates an exemplary charge redistribution SAR ADC according to various embodiments of this invention.

In accordance with various embodiments, SAR ADC 500 can be implemented as a charge redistribution SAR ADC. In general, a charge redistribution SAR ADC can use a charge scaling DAC, comprising an array of individually switched binary-weighted capacitors. FIG. 6 is an exemplary schematic of a charge redistribution SAR ADC 600. Here, capacitor array, illustrated as dotted box 604, can comprise four capacitors: 8C, 4C, 2C and C. It is understood that each capacitor can correspond to one bit in a binary search. Thus, although DAC array 604 is illustrated having four capacitors, more or fewer capacitors can be used depending upon a desired precision of a binary search. The amount of charge upon each capacitor in the array can be used to perform a binary search in conjunction with a comparator 602 and successive approximation register (illustrated as control logic block 606 in FIG. 6).

DAC 604 can also include capacitors Cextra and Cdummy. When switch S1 is disconnected from the charge distribution network prior to conversion, a charge transfer through the switch can take place, causing the voltage Vcomp to change. This charge transfer can take placed due to non-ideal characteristics of the switch, which may be modeled with PMOS, NMOS Field Effect Transistors (FETs) or a combination thereof. These switches can have inherent capacitance between gate and source CGS, gate to drain CGD and drain to source CDS. When the switch states changes, a charge transfer dQ=Cfet*dV can take place which may add or subtract charge from the charge distribution network. Typically, this charge transfer takes place when the gate voltage of the FET changes, causing a voltage dV across the FETs CGD or CGS and an associated charge transfer to develop. To compensate for the voltage change at node Vcomp, a separate switch S2 and holding capacitor Cdummy can be introduced. Holding capacitor Cdummy and Cextra can be dimensioned so that the voltages Vcomp and V+ (voltage at the non-inverting input of comparator 602) match after the switches S1 and S2 are opened and the charge transfer has taken place.

In operation, sampling the input voltage Vin can include two steps: a sample step and a conversion step. Each of these steps is explained below.

In the sample step, capacitors in capacitor array 604 (e.g., 8C, 4C, 2C and C) can be connected to the input voltage Vin and switches S1 and S2 can be closed. In this state, a top capacitance Qtop charge path (represented by dotted box Qtop in FIG. 6) can be described by the following equation:

$$Q\text{top}=(8C+4C+2C+C)*(V\text{in}-V\text{ref}) \quad \text{(equation 1)}$$

There can also be a charge Qextra, represented by the following equation:

$$Q\text{extra}=-C\text{extra}*V\text{ref} \quad \text{(equation 2)}$$

Note that relative to the charge according to equation 1, the charge in equation 2 is negative. The total charge can then be represented by the following equation:

$$Q\text{total}=Q\text{top}+Q\text{extra}; \text{ or} \quad \text{(equation 3)}$$

$$Q\text{total}=Q\text{top}=(8C+4C+2C+C)*(V\text{in}-V\text{ref})-C\text{extra}*V\text{ref}$$

The charge path for Qtotal can be represented by dotted box Qtotal in FIG. 6. Accordingly, charge during the conversion step can be conserved, as any positive charge contribution to the sum of the capacitances connected to Vtop (the sum of capacitances connected to Vtop can be referred to herein as Cx) can be matched by a negative charge contribution of the sum of the capacitances connected to Vbot (the sum of capacitances connected to Vbot can be referred to herein as Cy). The equation for this can be:

$$Cx*(V\text{top}-V\text{comp})-Cy*(V\text{comp}-V\text{bot})=Q\text{total} \quad \text{(equation 4)}$$

In equation 4, the comparison Vcomp is the voltage at the inverting node of comparator 602. By equating equation 4 and equation 3, the voltage Vcomp can be calculated and, thus, the binary value representing the analog input level based on any combination of Cx and Cy. It should be noted that Cx is the total capacitance connected to Vtop and Cy is the total capacitance connected to Vbot. In other words, the total charge Qtotal can always be conserved, no matter whether the end of each capacitor in capacitor array 604 is connected to input voltage Vin, high voltage Vtop or low voltage Vbot.

In the conversion step, switches S1 and S2 can be opened and capacitors in capacitor array 604 can be sequentially connected to a high voltage Vtop or a low voltage Vbot in accordance with a binary search algorithm. For example, in a first step of the conversion process, the most significant bit (MSB) capacitor (e.g., 8C in FIG. 6) in capacitor array 604 can be switched to the high voltage Vtop, resulting in a comparison voltage Vcomp which can be equal to Vtop/2. Thus, if the input voltage Vin is greater than Vtop/2, then the comparator can output a digital 1 as the MSB; otherwise it can output a digital 0 as the MSB. Each capacitor can be tested in the same manner until all capacitors are tested.

The following is a detailed explanation of a binary search algorithm using a charge redistribution network architecture, such as the architecture illustrated in FIG. 6, in accordance with various embodiments. In general, a conversion phase can require a step for each bit. For example, for a 4 bit SAR, four conversion steps may be needed to render a 4-bit output code. Each step can yield a comparator output that, when high, can reflect that the corresponding bit in a result register needs to be set. The capacitors in the charge distribution network can be binary weighted so that any combination of capacitors either tied to a high voltage Vtop or a low voltage Vbot can resolve $2^n$ voltage levels between dynamic input range limits Vtop and Vbot. In addition, in the following exemplary description, the MSB capacitor can be referred to as the bit 0 capacitor and the least significant bit (LSB) capacitor is referred to as bit n−1 capacitor, where n can be the number of capacitors in the charge distribution array (and also the number of conversion steps).

In a first step, a bit 0 capacitor (e.g., 8C in FIG. 6) can be pulled to high (e.g., Vtop), and bit 1 to bit n capacitors (e.g., 4C, 2C and C in FIG. 6) can be pulled to low (e.g., Vbot). If a comparison voltage Vcomp is below the reference voltage Vref, bit 0 in the output register can be set; otherwise it can be cleared. In a second step, bit 1 capacitor (e.g., 4C in FIG. 6) can be pulled to high (e.g., Vtop). The bit 0 capacitor can be either kept connected to high voltage Vtop (e.g., when bit 0 in the output register is set), or it can be connected to low voltage Vbot. In an nth step, bit n−1 capacitor in pulled high. The bit n−2 capacitor is either kept connected to high voltage Vtop (e.g., when bit n−2 in the output register is set), or is connected to low voltage Vbot.

The following is a more specific example on how the node voltage Vcomp can be rendered for an input voltage Vin that is greater than the reference voltage Vref In this example, assume the input voltage Vin is 1V and the dynamic range of the SAR ADC is from Vbot=0 to Vtop=1.3V. The reference voltage can then be 0.65V and to keep this example simple, Cextra may be zero. During the sampling phase, the charge distribution network can be connected between input voltage Vin and reference voltage Vref, charging the charge distribution network to the difference between Vin and Vref=(Vin−Vref)=1V−0.65V=0.35V. In a first step of the conversion phase, the MSB capacitor (capacitor 8C in FIG. 6) can connected to high voltage Vtop=1.3V and the LSB capacitors (capacitors 4C, 2C and 1C in FIG. 6) can be connected to low voltage Vbot, which can be connected to ground (GND). Assuming for a moment that the MSB capacitor would be floating, the Vcomp node could momentarily transition to:

$$Vcomp\_low = Vbot - (Vin - Vref) \, 0V - 0.35V = -0.35V \quad \text{(equation 5)}$$

as the voltage across the MSB capacitors would initially not change. Similarly, assuming for a moment that the LSB capacitors would be floating, the MSB capacitor would pull the Vcomp node to:

$$Vcomp\_hi = Vtop - (Vin - Vref) = 1.3V - 0.35V = 0.95V \quad \text{(equation 6)}$$

as the voltage across the MSB capacitor may not change initially. Therefore, a differential voltage Vcomp_dif across the charge distribution network could be calculated as:

$$Vcomp\_dif = Vcomp\_hi - Vcomp\_lo = 0.95V - (-0.35V) = 1.3V \quad \text{(equation 7)}$$

In addition, the MSB capacitor can form a capacitive voltage divider with the LSB capacitors, i.e. the differential voltage Vcomp_dif can cause a voltage step (Vstep) across the LSB capacitors as follows:

$$Vstep = Ccd\_msb/(Ccd\_msb + Ccd\_lsb) * Vcomp\_dif \quad \text{(equation 8)}$$

Where Ccd_msb=MSB capacitor; and Ccd_lsb=sum of all LSB capacitors. This voltage can appear relative to Vcomp_lo. Therefore, $$Vcomp = Ccd\_msb/(Ccd\_msb + Ccd\_lsb) * Vcomp\_dif + Vcomp\_lo \quad \text{(equation 9)}$$

Accordingly, in above example, the voltage seen at node Vcomp would be $8/15 * 1.3V - 0.35V = 0.343V$. This would cause the comparator to provide a logic high at its output, i.e. indicating that the MSB is high.

The following as an example for an input voltage Vin that is less than the reference voltage Vref, i.e., Vin<Vref. Assuming for this example that the input voltage Vin=0.3V, then $$Vcomp\_lo = Vbot - (Vin - Vref) = 0V - (0.3V - 0.65V) = 0.35V; \text{ and}$$

$$Vcomp\_hi = Vtop - (Vin - Vref) = 1.3V - (0.3V - 0.65V) = 1.65V$$

Therefore, in this example, the voltage seen at node Vcomp would be $8/15 * 1.3V + 0.3V = 1.043V$. This would cause the comparator to provide a logic low at its output, i.e. would indicate that the MSB is low.

In accordance with some embodiments, the high voltage Vtop can essentially be the supply voltage Vsup of the analog channel and the low voltage Vbot can be ground. For example, if the high voltage Vtop is the supply voltage Vsup, the reference voltage is Vsup/2, and the low voltage Vbot is ground, then the total dynamic input range of the charge redistribution SAR can be equal to the supply voltage Vsup. However, in order to utilize the dynamic input range of the SAR ADC, the component driving this SAR ADC may need to be able to swing from ground to Vsup. For example, the AAF 404 (FIG. 4) may need to generate an output voltage swing from ground to Vsup. However, this can be difficult to accomplish since the top and bottom of a biasing structure of an AAF output driver can prevent the latter to swing within its rails. For example, if the AAF block 404 only swings from 0.25V to 1.0V, but the supply voltage Vsup=1.25V, then only 60% of the dynamic input range of the SAR may be utilized. In such embodiments, the dynamic input range of the circuit 600 can be a function of the supply voltage Vsup and the potential GND and, thus, limited.

To compensate for a limited dynamic range, some embodiments can use reference buffers to adjust the high voltage Vtop and low voltage Vbot to narrow in a desired range. For example, the high voltage Vtop can be adjusted to Vtop=1V and the low voltage Vbot can be adjusted to Vbot=0.25V. These embodiments can have drawbacks, however. For example, some embodiments using reference buffers can be very power hungry. In addition, the reference buffers may need to be able to drive capacitive loads at high speeds, while providing good transient response and maintaining stability. This can translate into a need for large bias currents. For example, in one embodiment, a reference buffer may draw as much as 300 uA which can increase the power budget for the entire analog channel by 30%.

In accordance with various embodiments, to adjust the dynamic input range without adjustment of the high voltage Vtop and the low voltage Vbot, each capacitor in the charge distribution network can be used to cover a certain portion of the dynamic input range. For example, with further reference to FIG. 6, capacitor 8C can cover about half of the dynamic input range; specifically, because the percentage of capacitance of the MSB capacitor 8C relative to the capacitor array is about 53% (i.e., 8C/15C*100=53.3) means that the dynamic input range can be about 53%. This can mean that if capacitor 8C is statically tied to either the high voltage Vtop or the low voltage Vbot after the initial sampling stage, the conversion results can cover approximately 53 percent of the dynamic input range of the SAR.

However, since it may be desirable to maintain resolution of the SAR, a capacitor can be added to the DAC array in accordance with some embodiments. During the initial sampling stage, this added capacitor can be connected to the input voltage Vin. During the conversion stage, this added capacitor can be statically tied to either the high voltage Vtop or the low voltage Vbot. The dynamic range the ADC can accommodate can be calculated as follows:

$$DR\_SCALE=100*Ccd/(Ccd+Cscale) \quad \text{(equation 10)}$$

Where Ccd can be the sum of the capacitors used in the charge redistribution array (e.g., 8C+4C+2C+C), Cscale can be the scaling capacitance, and DR_SCALE can be the output range of the function driving the SAR, relative to the dynamic input range of the ADC when Cscale=0.

For example, if the dynamic input range of the ADC is 1.3V but the AAF block 404 driving the ADC has a dynamic output range of ~0.85V, then only 0.85V/1.3V~65% of the ADC's dynamic input range is utilized. In order to match the ADCs dynamic input range to the output range of the AAF block 404, a suitable scale capacitor needs to be used. From equation 10 we obtain Cscale=Ccd*(100/DR_SCALE-1). With substitutions DR_SCALE~65% and Ccd=15C we obtain Cscale~8C.

Another issue can arise when the dynamic input range of the function driving the SAR ADC is offset with respect to the SAR dynamic input range. For example, AAF block 404 may have a dynamic output range from 0.25V to 1V, but the SAR may have a dynamic input range of 0.35 to 1.1V. However, because each capacitor in the charge distribution network can affect the dynamic input range, one or more capacitors can be used to shift the dynamic input range relative to the reference voltage Vref. For instance, during the conversion stage, the most significant bit capacitor (e.g., 8C) can cause a shift of half the dynamic input range when pulled to the high voltage Vtop. Similarly, the next most significant bit capacitor (e.g., 4C) can cause a shift of a quarter of the dynamic input range when pulled to the high voltage Vtop during the conversion stage. In other words, when the most significant bit capacitor is pulled to the high voltage Vtop, the SAR can cover the dynamic input range from Vref=Vsup/2 to Vsup. Therefore, to offset the dynamic input range of the SAR ADC toward the low voltage Vbot, the offset capacitor can be connected to the low voltage Vbot during the conversion stage. Similarly, an offset capacitor can be connected to the high voltage Vtop during the conversion stage to offset the dynamic input range of the SAR ADC toward the high voltage Vtop. The possible drawback can be that adding an offset capacitor can also scale the ADC input range. Therefore, to maintain the dynamic range DR_SCALE of the ADC for different offset settings, the scale capacitor Cscale can be split into two individual capacitors: one that is referenced to the upper reference voltage Vtop and another that is referenced to the lower reference voltage Vbot during the conversion stage. In other words, Cscale=Ctop+Cbot=constant. Using this scheme can allow offset adjustment while maintaining the scale DR_SCALE. The amount of offset adjustment relative to the 50% point of the ADC's dynamic input range can be calculated as follows:

$$DR\_OFFSET=100*(Ccd+Ctop)/(Ccd+Ctop+Cbot)-DR\_MID \quad \text{(equation 1.1)}$$

Where:

$$Cscale=Ctop+Cbot=\text{constant} \quad \text{(equation 11.2)}$$

$$DR\_MID=100*(Ccd+Cscale/2)/(Ccd+Cscale) \quad \text{(equation 11.3)}$$

Substitution of the terms in equations 11.2 and 11.3 in equation 11.1 we obtain:

$$DR\_OFFSET=100*((Ctop-Cscale/2)/(Ccd+Cscale)) \quad \text{(equation 11.4)}$$

Note that Cscale can be constant to maintain constant scale during offset adjustment. DR_MID can be the mid-point setting at which half of Cscale is pulled to Vtop and other half to Vbot In some embodiments, using scale and offset capacitors as described above can reduce power by a factor of three or more in comparison to using reference buffers.

Figure 7:
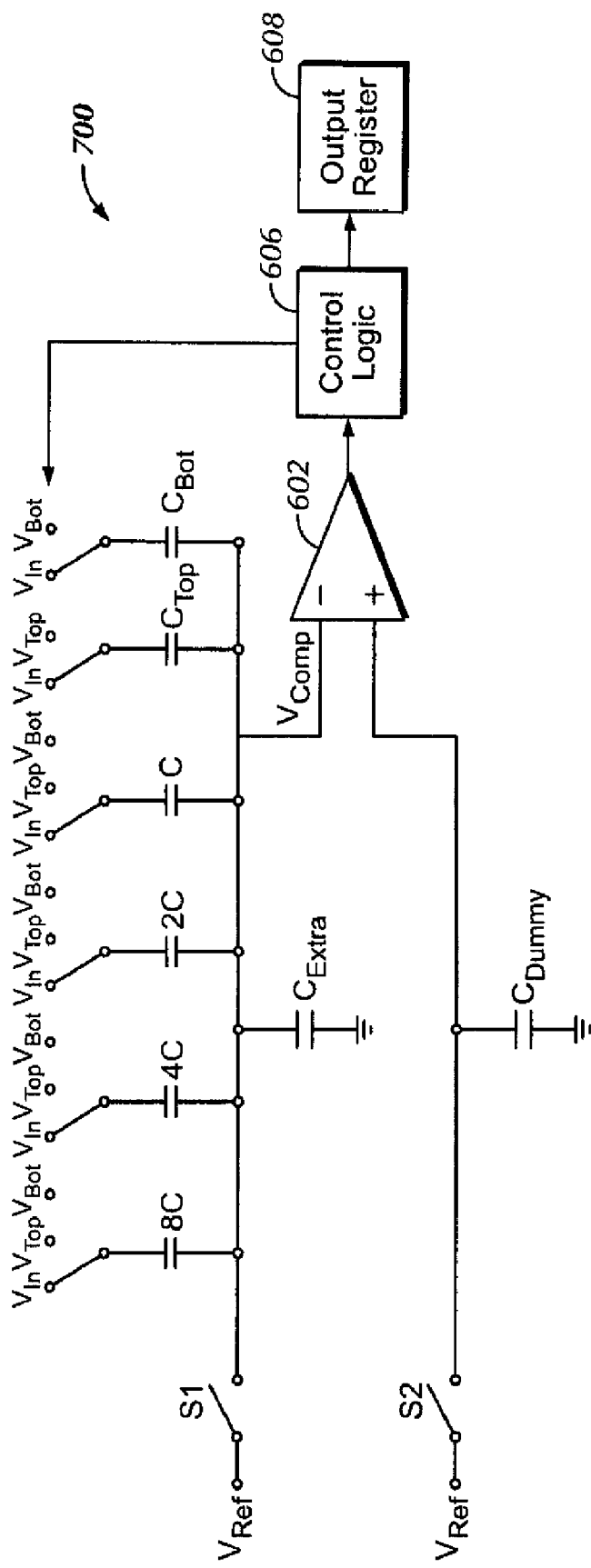
FIG. 7 illustrates a further exemplary charge redistribution SAR ADC according to various embodiments of this invention.

FIG. 7 illustrates circuit variation 700 that can perform dynamic scaling and account for offset in accordance with various embodiments. Specifically, circuit 700 can include additional capacitors Ctop and Cbot. Ctop and Cbot can each be set to either high voltage Vtop or low voltage Vbot, respectively. If one of Ctop or Cbot is set to Vbot, then the dynamic range can shift down. In contrast, if one of Ctop or Cbot is set to Vtop, then the dynamic range can shift up. Accordingly, capacitor Ctop and Cbot can add a contribution or take a contribution away; depending upon the node to which respective capacitor is connected.

In some embodiments, the capacitance of Ctop and Cbot, combined, can equal the capacitance of one of the capacitors in the capacitor array, such as capacitor 8C. Thus, a total capacitance 8C can be split between the two capacitors Ctop and Cbot, for example. In this manner, scaling the dynamic range can be a function of Ctop+Cbot and the offset can be a function of Ctop/Cbot. Accordingly, the size of the capacitors Ctop and Cbot can be adjusted to vary the scaling of the dynamic input range. In addition, if it is desired to change the offset, the ratio of Ctop and Cbot can be changed. In one implementation, Ctop and Cbot can be adjustable so that the ratios can be easily changed.

The initial charge stored in the charge redistribution network during the initial sampling stage for the SAR topology as shown in FIG. 7 can be described as:

$$Qtot=(Ccd+Ctop+Cbot)*(Vin-Vref)-Cextra*(Vref-Vbot) \quad \text{(equation 14)}$$

Where Ccd=total capacitance of charge re-distribution network, e.g. 8C+4C+2C+C for a 4 bit SAR. Based on the total charge Qtot, the node voltage Vcomp during the charge redistribution phase can be calculated as follows:

$$Qtot=(Ccd\_top+Ctop)*(Vtop-Vcomp)-(Ccd\_bot+Cbot+Cextra)*(Vcomp-Vbot) \quad \text{(equation 15)}$$

Where Ccd_top can be the charge redistribution capacitors connected to the high voltage Vtop, Ccd_bot can be the charge redistribution capacitors connected to the low voltage Vbot, and Ccd can be equal to Ccd_top+Ccd_bot.

The top end of the dynamic range can be calculated when all charge redistribution capacitors are connected to the high voltage Vtop, i.e. Ccd=Ccd_top+Ccd_bot and Vcomp equals Vref Equating equation 14 with 15 and making the following substitutions: Ccd_top=Ccd, Ccd_bot=0; Vcomp=Vref; and Vin=Vdr_top, results in the following equation:

$$(Ccd+Ctop+Cbot)*(Vdr\_top-Vref)-Cextra*(Vref-Vbot)=(Ccd+Ctop)*(Vtop-Vref)-(Cbot+Cextra)*(Vref-Vbot) \quad \text{(equation 16)}$$

Equation 16 solved for Vdr_top:

$$Vdr\_top=((Ccd+Ctop)*(Vtop-Vref)-(Cbot+Cextra)*(Vref-Vbot)+Cextra*(Vref-Vbot))/(Ccd+Ctop+Cbot)+Vref \quad \text{(equation 17)}$$

Note that when Ctop=Cbot=0 the upper limit of the dynamic input range of SAR 600 illustrated in FIG. 6 can be calculated: Vdr_top=Vtop The bottom end of the dynamic range can be calculated when all charge redistribution capacitors are connected to the low voltage Vbot, and the comparison voltage Vcomp equals the reference voltage Vref. By equating equations 14 and 15 and making the following substitutions: substituting Ccd_top=0, Ccd_bot=Ccd; Vcomp=Vref; and Vin=Vdr_bot, results in the following equation:

$$(Ccd+Ctop+Cbot)*(Vdr\_bot-Vref)-Cextra*(Vref-Vbot)=Ctop*(Vtop-Vref)-(Ccd+Cbot+Cextra)*(Vref-Vbot) \quad \text{(equation 18)}$$

Equation 18 solved for Vdr_bot equals:

$$Vdr\_bot=(Ctop*(Vtop-Vref)-(Ccd+Cbot+Cextra)*(Vref-Vbot)+Cextra*(Vref-Vbot))/(Ccd+Ctop+Cbot)+Vref \quad \text{(equation 19)}$$

Note that for Ctop=Cbot=0, the lower limit of the dynamic input range of SAR 600 illustrated in FIG. 6 can be calculated: Vdr_bot=Vbot.

The topology of FIG. 7 can have several advantages over a reference buffer topology. First, adjusting the high voltage Vtop and the low voltage Vbot using reference buffers may require dedicated DACs and associated DAC references dependent on the amount and resolution of adjustment needed. Second, the tolerances can be limited and may require trimming, e.g. the initial tolerance may be 5% and the references may be subject to temperature drift. Second, a high voltage Vtop and a low voltage Vbot reference buffer may consume relatively large quiescent currents, as each may have to drive the entire charge distribution network at high rates. This can require good transient response and wide bandwidth similar to the requirements of a sample and hold buffer. In an implementation using reference buffers, the reference buffers can consume 60% of the overall power budget for a given SAR. In contrast, adding capacitance to the charge distribution network need only require a slight modification of the sample and hold buffer in order to maintain good transient response and sufficient bandwidth.

The incremental increase in dynamic current consumption can be calculated as dCcd*Vcd*fcd, where dCcd=increase of the charge distribution capacitance due to the addition of Ctop and Cbot; Vcd=voltage driving the charge distribution network (e.g., Vsup, Vtop, Vin); and fcd=frequency at which the charge distribution network is driven. Thus, the dynamic current in combination in the increase in sample and hold bias current consumption due to increase of the charge redistribution capacitance can be considerably smaller. In one embodiment, the power consumption has been found to be reduced by a factor of three with respect to the reference buffer approach. Also, since capacitances can be matched with relatively high precision, the dynamic range and offset adjustments can be controlled with higher precision then what is possible with the reference buffer approach described earlier.

Figure 8:
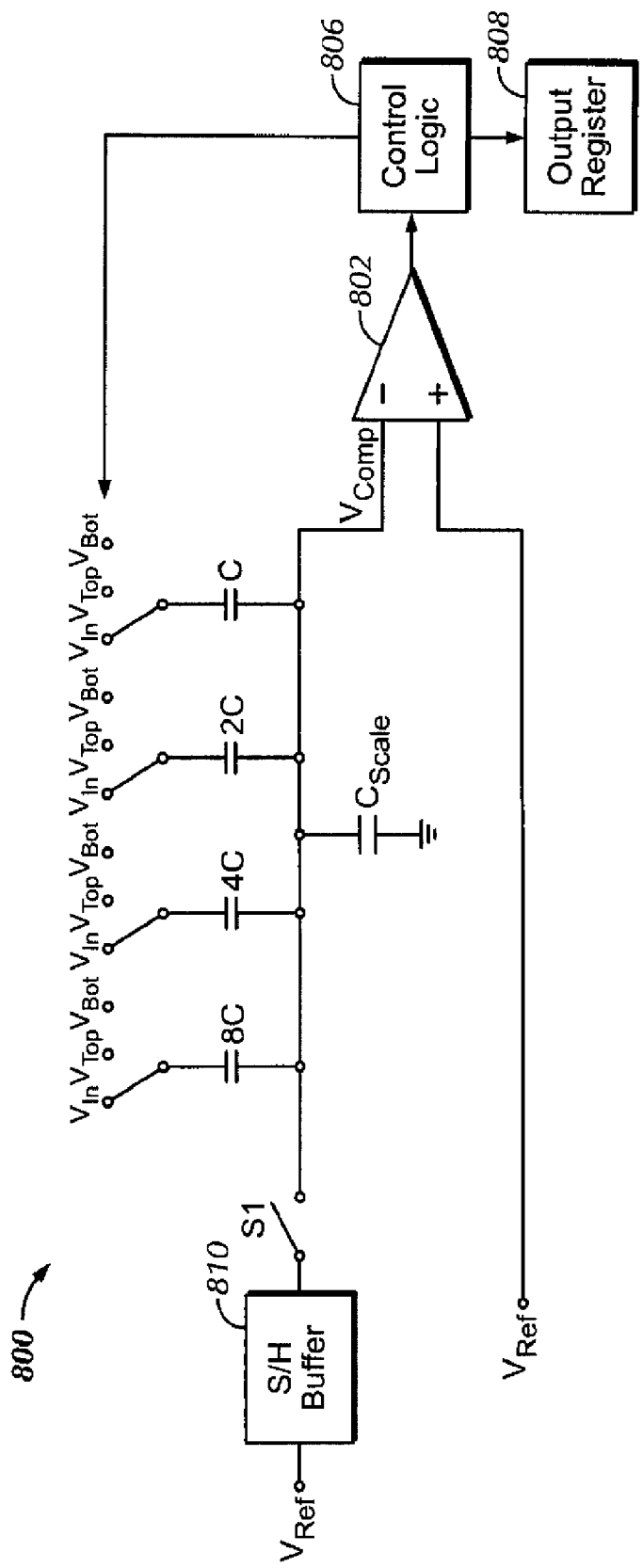
FIG. 8 illustrates yet another exemplary charge redistribution SAR ADC according to various embodiments of this invention.

FIG. 8 shows a further implementation of a scaling SAR architecture 800. Here, a scaling capacitor (Cscale) can be introduced to scale the dynamic input range of the ADC. During the sampling stage, the charge distribution network can be connected to the output of a sample and hold buffer 810 via switch S1. The total charge stored in the charge distribution network after the sampling stage can be defined as:

$$Qtot=Ccd*(Vin-Vref)+Cscale*Vin \quad \text{(equation 20)}$$

The total charge during the conversion stage can be defined as:

$$(Ccd\_top)*(Vtop-Vcomp)-(Ccd\_bot)*(Vcomp-Vbot)+Cscale*Vcomp=Qtot \quad \text{(equation 21)}$$

To calculate an upper dynamic input range (Vdr_top) of the SAR ADC, one can recognize that the full-scale ADC output code (Ccd pulled to Vtop) at Vcomp=Vref can corresponds to a Vin at the upper limit of the ADC dynamic input range. Due to charge conservation, equation 20 can be equal to equation 21. With the following substitutions: Ccd_bot=0; Ccd_top=Ccd; Vin=Vdr_top; and Vcomp=Vref, one can obtain the following equation:

$$Ccd*(Vin-Vref)+Cscale*Vin=(Ccd\_top)*(Vtop-Vcomp)-(Ccd\_bot)*(Vcomp-Vbot)+Cscale*Vcomp \quad \text{(equation 22)}$$

Equation 21 solved for the top dynamic range voltage Vdr_top can be represented as:

$$Vdr\_top=(Ccd*(Vtop-Vref)+Cscale*Vref+Ccd*Vref/(Ccd+Cscale) \quad \text{(equation 23)}$$

To calculate the dynamic lower range (Vdr_bot) of the ADC, one can recognize that a SAR ADC output code of zero (Ccd pulled to Vbot) at Vcomp=Vref can correspond to an input voltage at the lower dynamic input range limit. Due to charge conservation, equation 19 can be equal equation 20, and with the following substitutions: Ccd_bot=Ccd; Ccd_top=0; Vin=Vdr_bot; Vcomp=Vref, one can obtain the following equation:

$$Ccd*(Vdr\_bot-Vref)+Cscale*Vdr\_bot=Ccd*(Vref-Vbot)+Cscale*Vref \quad \text{(equation 24)}$$

Equation 24 solved for Vdr_bot can be represented as:

$$Vdr\_bot=Ccd*(Vref-Vbot)+(Cscale-Ccd)*Vref/(Ccd+Cscale) \quad \text{(equation 25)}$$

Thus, the topology illustrated in FIG. 8 can also provide the benefits of dynamic scaling.

Figure 9:
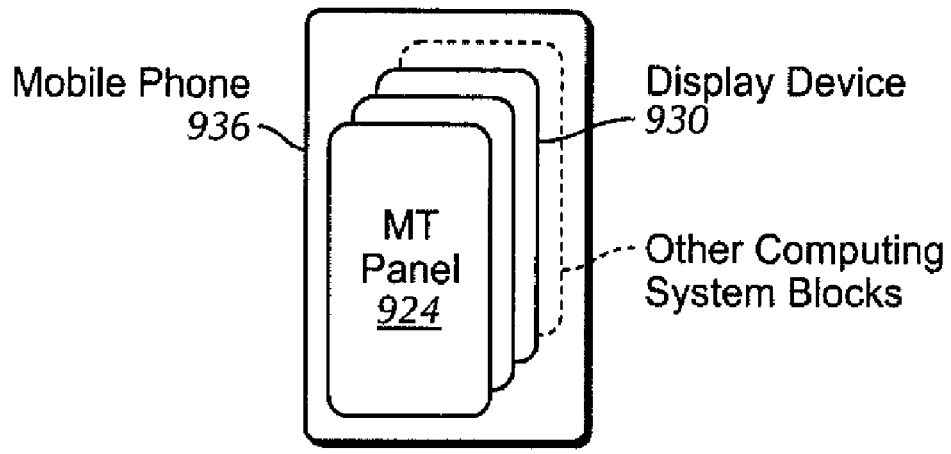
FIG. 9 illustrates an exemplary mobile telephone that can include multi-touch panel, display device, and other computing system blocks according to one embodiment of this invention.

FIG. 9 illustrates an exemplary mobile (e.g., cellular) telephone 936 that can include multi-touch panel 924, display device 930, and receive channels having SAR ADCs as described above.

Figure 10:
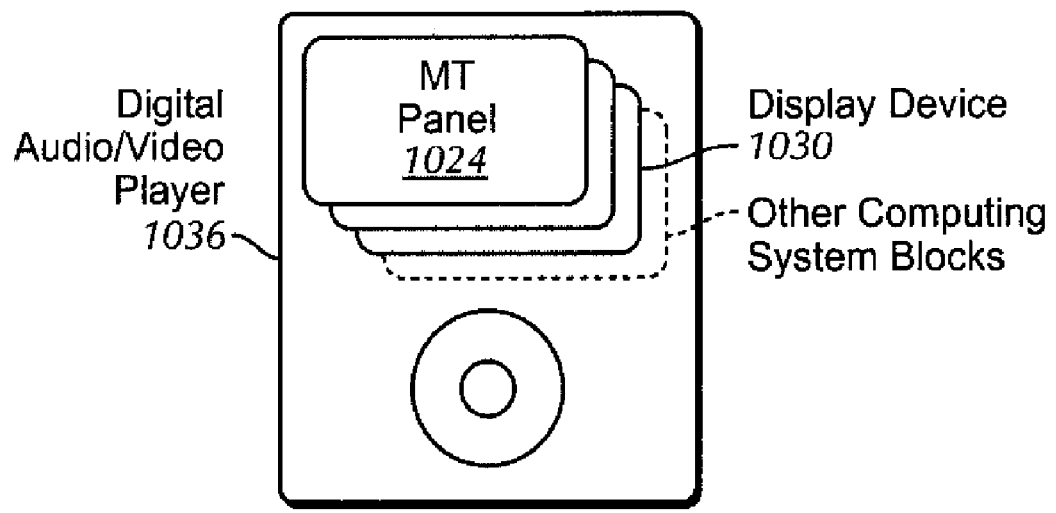
FIG. 10 illustrates an exemplary digital audio/video player that can include multi-touch panel, display device, and other computing system blocks according to one embodiment of this invention.

FIG. 10 illustrates an exemplary digital audio/video player 1036 that can include multi-touch panel 1024, display device 1030, and receive channels having SAR ADCs as described above.

Figure 11:
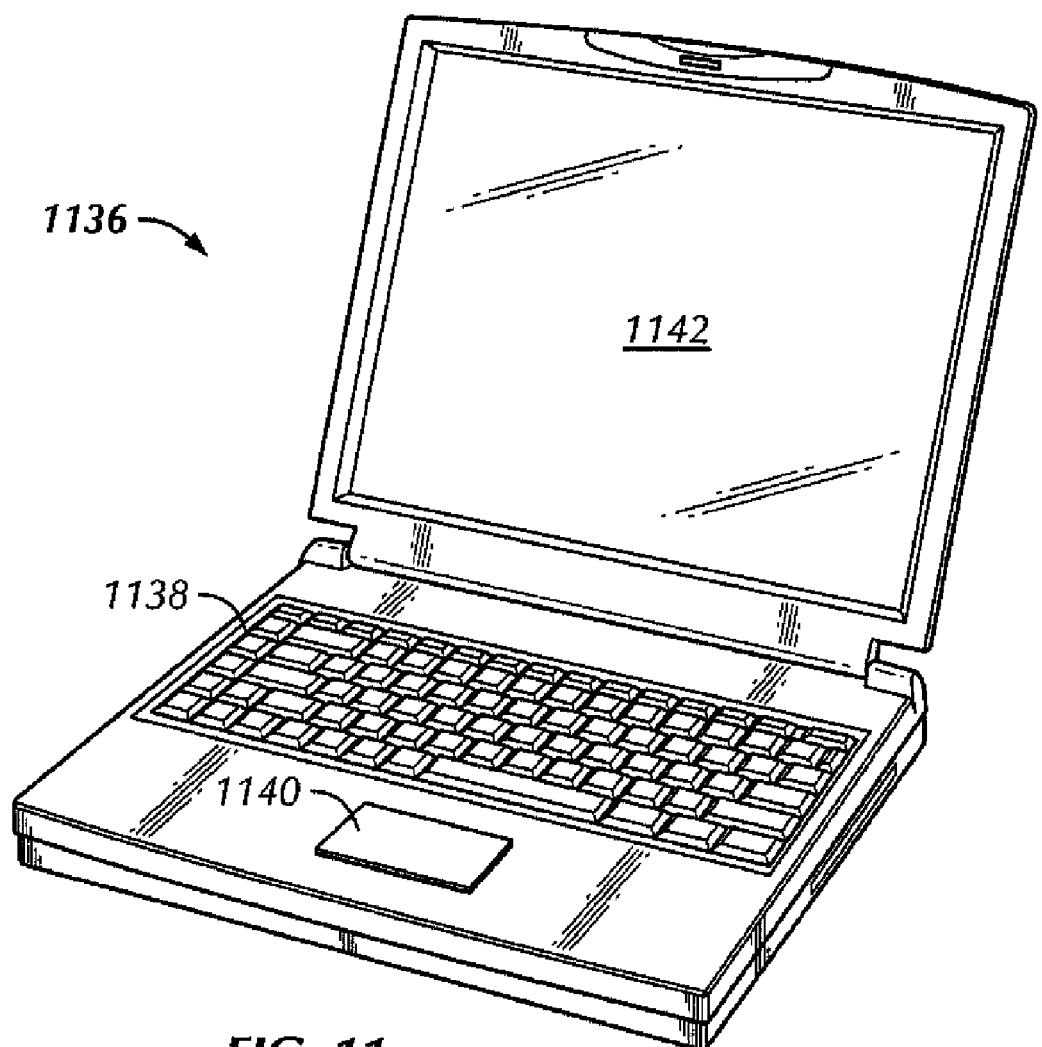
FIG. 11 illustrates an exemplary personal computer that can include a multi-touch panel and receive channels having SAR ADCs according to one embodiment of this invention.

FIG. 11 illustrates an exemplary personal computer 1136 with keyboard 1138, display 1142 and trackpad 1140 that can include a multi-touch panel and receive channels having SAR ADCs as described above. In accordance with some embodiments, display 1142 can also include a multi-touch panel so that computer 1136 can detect multiple touch events at the same time on both trackpad 1140 and display 1142.

While this invention has been described in terms of several preferred embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device. Additionally, although the embodiments herein have been described in relation to touch panels, the teachings of the present invention are equally applicable to touch screens, touch pads or any other touch surface type of sensor.

Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An apparatus for generating an image of touch on or about a touch-sensitive surface, comprising:
   a touch panel, the touch panel including a plurality of touch sensors configured for detecting one or more touch events; and
   a plurality of receive channels couplable to the touch panel for generating values representative of detected touch events, at least some of the plurality of receive channels comprising:
   (i) a charge amplifier connectable to the multi-touch panel;
   (ii) an anti-aliasing filter connectable to the charge amplifier; and
   (iii) a successive approximation register digital-to-analog converter (SAR ADC) connectable to the anti-aliasing filter, the SAR ADC configurable to convert an analog waveform into a digital representation using a binary search and outputting the digital representation to an output register.

2. The apparatus of claim 1, wherein the one or more receive channels form part of a single multi-touch subsystem for processing touch events.

3. The apparatus of claim 2, the multi-touch subsystem comprising driver logic couplable to the touch panel and configured for driving the touch panel with a stimulus for enabling a detection of touch events.

4. The apparatus of claim 1, wherein the SAR ADC comprises a charge redistribution capacitor array.

5. The apparatus of claim 4, wherein the SAR ADC comprises a scaling capacitor configurable for scaling a dynamic input range of the SAR ADC.

6. The apparatus of claim 4, wherein the SAR ADC comprises a first capacitor and a second capacitor, the first and second capacitors configurable for i) scaling a dynamic input range of the SAR ADC; and ii) offsetting the dynamic input range by shifting the dynamic input range relative to a reference voltage.

7. The apparatus of claim 6, wherein the first and second capacitors are adjustable.

8. The apparatus of claim 6, wherein scaling of the dynamic input range is a function of the sum of the capacitances of the first capacitor and the second capacitor.

9. The apparatus of claim 6, wherein the offset is a function of the ratio of capacitances between the first capacitor and the second capacitor.

10. The apparatus of claim 1, further comprising a computing system that incorporates the apparatus, the computing system comprising:
    a multi-touch subsystem couplable to the plurality of touch sensors;
    a multi-touch panel processor coupled to the multi-touch system; and
    a host processor coupled to the multi-touch panel processor.

11. The apparatus of claim 10, further comprising one of: (i) a mobile telephone that incorporates the computing system; (ii), a digital audio player that incorporates the computing system; or (iii) a personal computer that incorporates the computing system.

12. The apparatus of claim 1, further comprising a trackpad that incorporates the touch panel.

13. The apparatus of claim 1, further comprising a touch sensitive display screen that incorporates the touch panel.

* * * * *